United States Patent [19]

Yang et al.

[11] Patent Number: 5,699,463

[45] Date of Patent: Dec. 16, 1997

[54] MECHANICAL FIBER OPTIC SWITCH

[75] Inventors: Long Yang, Union City; Gary R. Trott, San Mateo; Karl Shubert, Healdsburg; Karl Salomaa, Jenner; Kent W. Carey, Palo Alto, all of Calif.

[73] Assignee: Hewlett-Packard Company, Palo Alto, Calif.

[21] Appl. No.: 497,497

[22] Filed: Jun. 28, 1995

[51] Int. Cl.$^6$ ................................ G02B 6/26; G02B 6/42
[52] U.S. Cl. ................................................ 385/22; 385/25
[58] Field of Search .................................. 385/22, 25, 33, 385/50

[56] References Cited

U.S. PATENT DOCUMENTS

| 4,193,662 | 3/1980 | Hara | 385/22 |
| 4,651,343 | 3/1987 | Laor | 385/22 |
| 4,699,457 | 10/1987 | Goodman | 350/96.2 |
| 5,297,225 | 3/1994 | Snow et al. | 385/25 |
| 5,359,683 | 10/1994 | Pan | 385/22 |

FOREIGN PATENT DOCUMENTS

| 790047430 | 10/1980 | European Pat. Off. | G02B 5/14 |
| 0140820 | 5/1985 | European Pat. Off. | H01S 3/08 |
| 0153243 | 8/1985 | European Pat. Off. | G02B 6/28 |

Primary Examiner—Akm E. Ullah
Assistant Examiner—Robert E. Wise

[57] ABSTRACT

A switch for selectively coupling light from an input optical fiber to a selected one of a plurality of output optical fibers. The switch includes a first carriage having one end of the input optical fiber attached thereto and a second carriage having the output optical fibers attached thereto such that one end of each of the output optical fiber lies between first and second distances with respect to the end of the input optical fiber when the output optical fiber is aligned with the input optical fiber. A lens that is fixed with respect to the end of the input optical fiber images light leaving the input optical fiber onto a plane lying between the first and second distances from the end of the input optical fiber. In one embodiment of the present invention, an encoder is integrated into the first and second carriages. The encoder includes an encoding input optical fiber having one end attached to the first carriage, the encoding input optical fiber being a single mode optical fiber. Light leaving the encoder is received by a second single mode optical fiber when the carriages are in a specified relationship to one another. The second single mode optical fiber can either be a fiber on the second carriage or encoding input optical fiber itself. In the later case, the second carriage includes a reflector which images the light from the encoding input optical fiber back into the encoding input optical fiber.

5 Claims, 5 Drawing Sheets

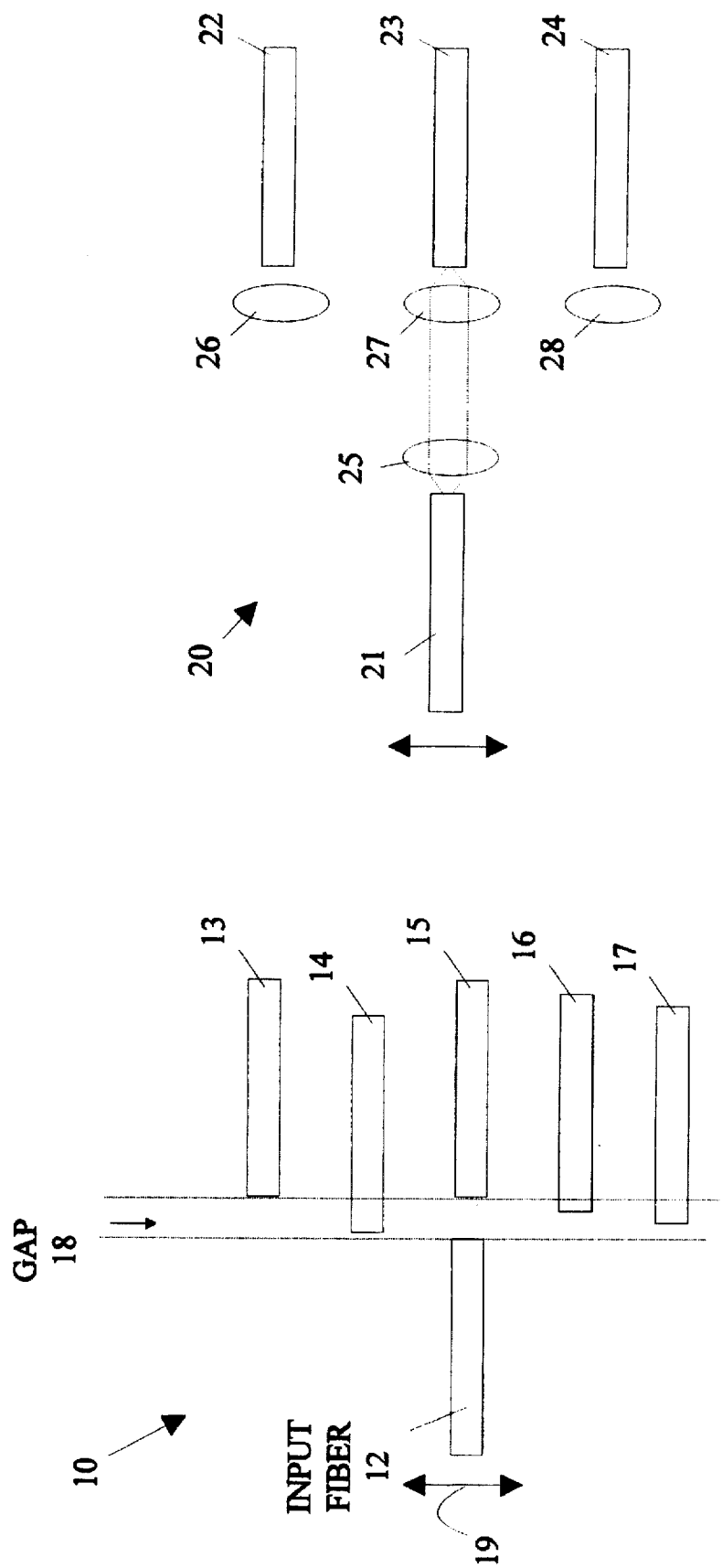

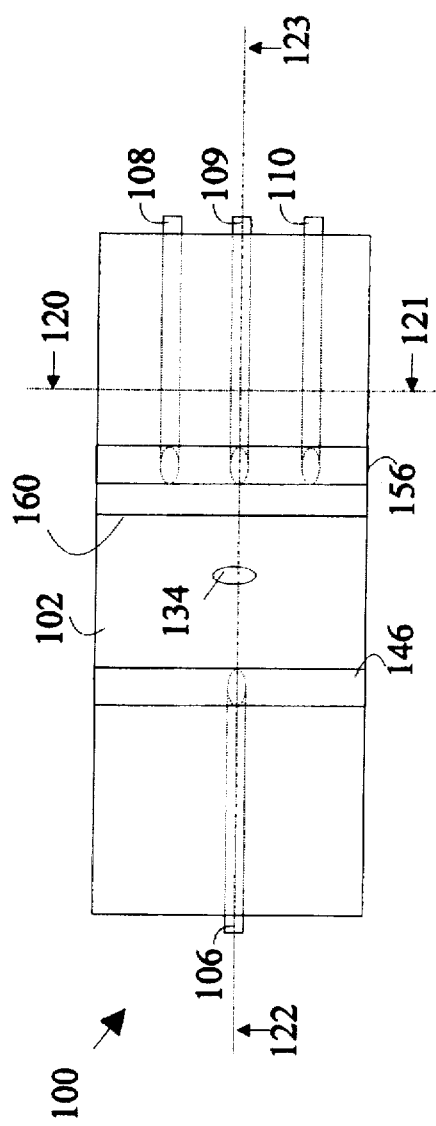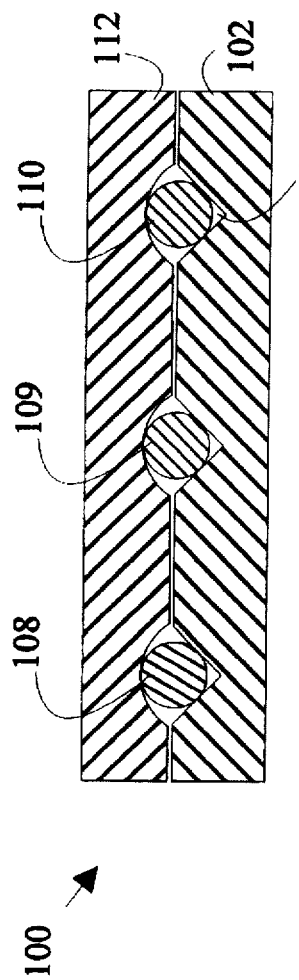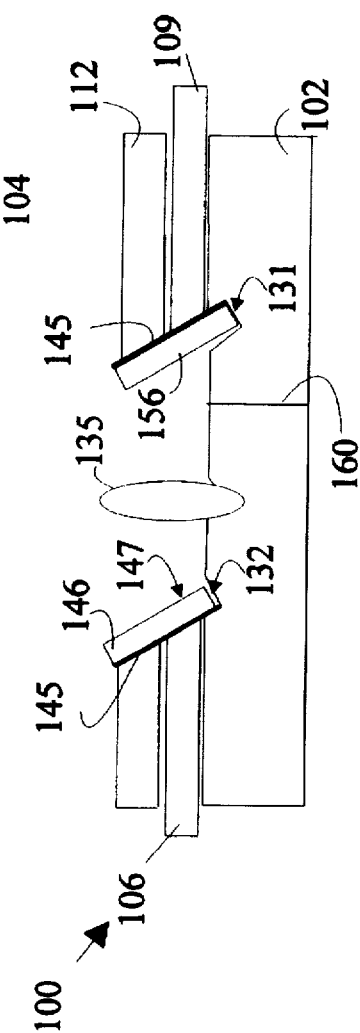

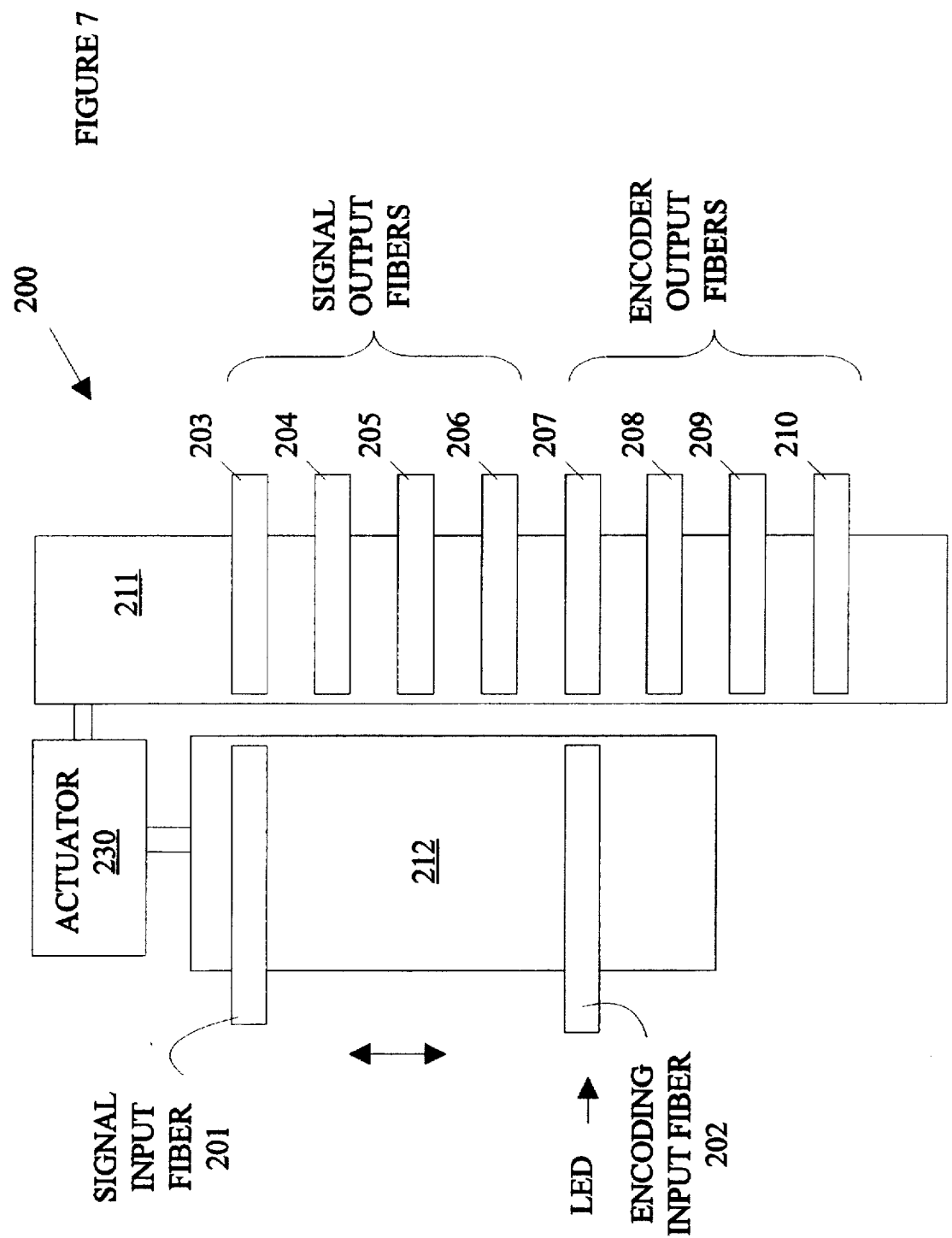

MECHANICAL FIBER OPTIC SWITCH

FIELD OF THE INVENTION

The present invention relates to fiber optics, and more particularly, to switches for routing light from one fiber to one of a plurality of fibers.

BACKGROUND OF THE INVENTION

To realize the potential of fiber optic transmission of light signals, some form of switching system must be provided for moving light signals from one fiber to another. In principle, mechanical switches have a number of advantages over other forms of optical switches for those applications in which switching speed is not important. Mechanical switches offer low insertion losses, a high degree of immunity against backscattering of light from the switch back down the input fiber, low cross-talk, and insensitivity to the wavelength of the light being switched.

Prior art mechanical switches, however, have been too costly to achieve full market acceptance. Such switches operate by moving an input fiber relative to a plurality of output fibers. The simplest schemes utilize a "butt-coupling" scheme in which the input fiber is aligned with one of a plurality of output fibers using a motor. The output fibers are usually fixed to a carrier and have ends cut at an angle to prevent reflections from the ends generating reflections that propagate back down the input fiber. The angle is typically 6 to 10 degrees.

To provide acceptable insertion losses, the ends of the fibers in a butt-coupled switch need to be separated by no more than 20μm. This tolerance is difficult to achieve in switches having a large number of output fibers. Hence, butt-coupling schemes, while appearing simple, are in reality difficult to implement in large fan-out switches.

If two lenses are introduced between the input fiber and the output fiber, the required tolerance is reduced. In such an arrangement, the light leaving the input fiber is expanded into a collimated beam which is then re-imaged into the output fiber. The beam is expanded sufficiently to reduce the alignment tolerance in all directions. Unfortunately, the cost associated with the lenses and the alignment of the lenses and the fibers is prohibitive.

Broadly, it is the object of the present invention to provide an improved fiber optic switch.

It is a further object of the present invention to provide a fiber optic switch with reduced alignment tolerances relative to conventional butt-coupled switches.

It is a still further object of the present invention to provide a fiber optic switch having fewer lenses than conventional switches using beam collimators.

These and other objects of the present invention will become apparent to those skilled in the art from the following detailed description of the invention and the accompanying drawings.

SUMMARY OF THE INVENTION

The present invention is a switch for selectively coupling light from an input optical fiber to a selected one of a plurality of output optical fibers. The switch includes a first carriage having one end of the input optical fiber attached thereto and a second carriage having the output optical fibers attached thereto such that one end of each of the output optical fiber lies between first and second distances with respect to the end of the input optical fiber when the output optical fiber is aligned with the input optical fiber. A lens that is fixed with respect to the end of the input optical fiber images light leaving the input optical fiber onto a plane lying between the first and second distances from the end of the input optical fiber. In one embodiment of the present invention, an encoder is integrated into the first and second carriages. The encoder includes an encoding input optical fiber having one end attached to the first carriage, the encoding input optical fiber being a single mode optical fiber. Light leaving the encoder is received by a second single mode optical fiber when the carriages are in a specified relationship to one another. The second single mode optical fiber can either be a fiber on the second carriage or encoding input optical fiber itself. In the later case, the second carriage includes a reflector which images the light from the encoding input optical fiber back into the encoding input optical fiber.

BRIEF DESCRIPTION OF THE DRAWINGS

FIG. 1 is a top view of a prior art butt-coupled switch.

FIG. 2 is a top view of a prior art collimated switch.

FIGS. 4, 5, and 6 illustrate a switch according to the present invention which includes the preferred alignment and passivating systems.

FIG. 7 is a top view of a switch utilizing an encoding system according to the present invention.

DETAILED DESCRIPTION OF THE INVENTION

Figure 3:
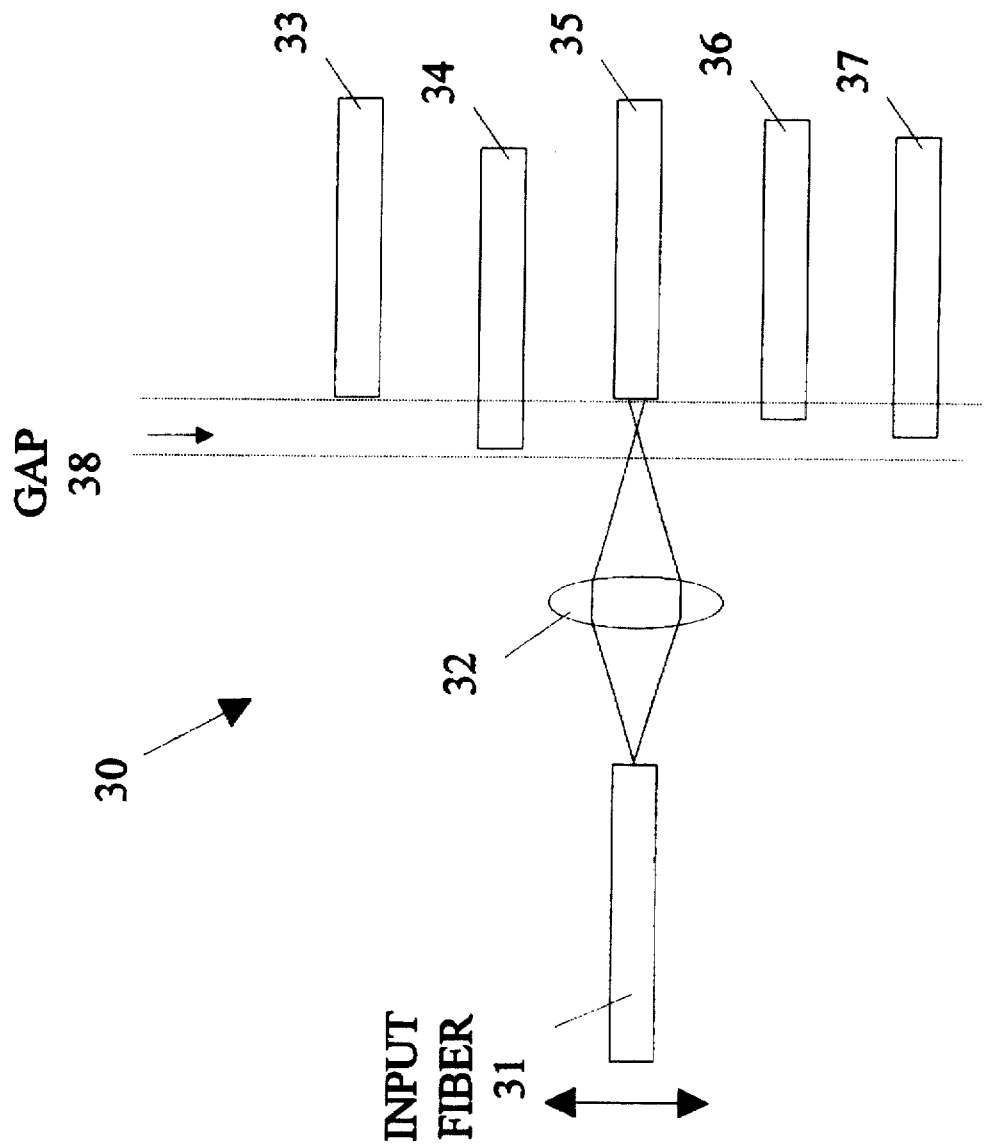
FIG. 3 is a top view of a fiber switch 30 according to the present invention.

The present invention may be more easily understood by first examining the manner in which conventional butt-coupled and lens collimated switches are made. Refer now to FIG. 1 which is a top view of a butt-coupled switch 10. In general, the input fiber 12 is attached to a carrier that allows input fiber to move with respect to the output fibers 13–17 in the directions shown by the arrows at 19. The ends of the input fiber and output fibers are cut at an angle, polished, and then coated with an anti-reflecting coating to prevent reflections from the end of the input fiber or the end of the abutted output fiber from propagating back down the input fiber. The precision with which this cutting and polishing operation is performed, in general, determines the tolerance that can be maintained. In general, the output fibers will be staggered by varying amounts.

Since the input fiber must be able to pass each of the fibers as it moves back and forth, a gap 18 must be maintained between the fibers. In principle, the gap is determined by the closest and farthest output fiber ends, fibers 13 and 15 shown in FIG. 1. If the input fiber end is placed any closer to the output fiber ends, the input fiber end will not be able to pass fiber 13. If it is placed any further away, the distance to all the output fiber ends, and hence the insertion loss, is increased. In practice, the gap is larger than desirable when the ends of the fibers are cut and polished as described above. While the gap can be reduced with high precision machining techniques, the cost of these techniques makes this approach unattractive.

The above analysis assumes that the carriage mechanism on which input fiber 12 is mounted and which is used to align input fiber 12 with the various output fibers moves exactly parallel to the support on which the output fibers are attached. If this is not the case, gap 18 must be made even larger to accommodate such imperfections.

In an effort to reduce the insertion loss problems and high degree of alignment tolerances required in butt-coupled schemes, prior art systems based on collimating lenses have been utilized. Refer now to FIG. 2 which is a top view of prior art light switch 20 which utilizes this approach to couple light from an input fiber 21 to one of plurality of output fibers shown at 22–24. The light leaving input fiber 21 is collimated by a lens 25 into a parallel beam of light which is re-imaged to a point by a corresponding lens on the output fiber which is currently aligned to the input fiber. Since the diameter of the lenses, and hence the collimated beam, are large compared to the core of the fiber, small alignment errors transverse to the direction of motion of the input fiber have only a small effect on the insertion efficiency. To first order, the efficiency is unaffected by changes in the distances between the two lenses; hence, the insertion losses that hamper butt-coupled systems are substantially reduced.

The improved tolerance to alignment errors and distances between the ends of the fibers, however, is achieved at a high cost. Each output fiber must be equipped with a lens. The cost of the lenses is a substantial fraction of the cost of a switch such as switch 20. In addition, the alignment tolerance of the lens relative to the corresponding fiber is as stringent as the tolerances required in butt-coupled systems. Hence, the cost of constructing a collimating lens switch is also a substantial fraction of the switch cost. Finally, the lenses must be large compared to the diameter of the fiber to provide the protection from alignment errors described above. Hence, the packing of the output fibers is substantially reduced in collimator based switch designs since the individual fibers must be physically spaced apart to make room for the lenses.

The present invention provides its advantages over the butt-coupled and collimator designs described above by utilizing a single lens on the input fiber to image the light from the input fiber into the corresponding output fiber. Refer now to FIG. 3 which is a top view of a fiber switch 30 according to the present invention. Light from input fiber 31 is imaged by lens 32 onto the output fiber currently across from input fiber 31. Exemplary output fibers are shown at 33–37. Lens 32 images the end of input fiber 31 at a point preferably in the middle of gap 38. Hence, switch 30 may be viewed as being a butt-coupled switch in which the image of the input fiber is "butt-coupled" to the output fibers. Since the image can pass through the ends of any fibers that extend beyond the mid-point of the gap, the image may be placed at its optimum location, i.e., the mid-point of the gap. As a result, the input fiber has an effective separation from the corresponding output fiber which is at most D/2, where D is the width of the gap, i.e., the distance between the closest and farthest output fiber ends with respect to the plane containing the input fiber end. As noted above, conventional butt-coupled systems must accommodate a distance of D. Hence, the present invention requires a factor of two lower precision in aligning the output fiber ends.

The added spacing provided by the inclusion of lens 32 also contributes to a significant reduction in the cost of providing the anti-reflecting coating needed to prevent light from being reflected back down the input fiber. As noted above, the ends of each fiber must be treated to avoid reflections generated at the glass-air interface from propagating back down the fiber. This treatment typically consists of cutting the end at an angle, polishing the end, and then coating the end with an anti-reflective coating. If a number of fibers must be positioned relative to one another, each end must be cut, polished, and coated.

Now refer to FIGS. 4, 5, and 6 which illustrate a switch according to the present invention which includes the preferred alignment and passivating systems. The required alignment tolerance is provided by a pedestal 102 which includes slots 104 that are positioned such that fibers that are forced against the bottom of each slot will be properly aligned with respect to one another. Exemplary output fibers are shown at 108–110. The input fiber is shown at 106. The fibers are forced against slots 104 by top plate 112 which is preferably cemented to pedestal 102. The manner in which pedestal 102 is constructed will be discussed in more detail below. The imaging lens 135 is likewise located in a slot provided in pedestal 102.

Refer now to FIG. 6 which illustrates the manner in which the ends of the optical fibers are treated to prevent light from reflecting back down the fibers at the glass-air interfaces. After the fibers have been secured against the bottom pedestal by the top plate, each fiber is cut at the desired angle by making a saw cut through the top plate 112. The cut extends into pedestal 102 as shown at 131 and 132. The saw cut severs each fiber at the correct angle. It should be noted that a single saw cut severs multiple fibers. In contrast to prior art systems, the ends of the optical fibers are not polished after the saw cut. Instead, a plate 146 is cemented to the fiber ends with the aid of a layer 145 of transparent cement. The index of refraction of the cement is chosen to match the index of the core of refraction of the fiber in the case of a single mode fiber. Plate 146 is constructed from a material that has the same index of refraction as the cement layer. Hence, any scratches on the side of plate 146 that are in contact with the cement layer or on the cut fiber end are eliminated by the layer of cement. The surface 147 of plate 146 that is not in contact with the cement layer is preferably coated with an anti-reflective material to further reduce reflections.

It should be noted that plate 146 is an inexpensive component that need only have one optically flat surface, i.e., surface 147. Hence, apparatus 100 can be constructed at a cost that is substantially less than the cost of systems in which the fiber ends are polished and coated with the anti-reflective material. It has been found experimentally, that the anti-reflection system of the present invention functions as well as the conventional cut and polished end system. Thus, the present invention provides the benefits of the prior art systems at a substantially reduced cost.

It should also be noted that this inexpensive passivation system is not possible in butt-coupled systems, because there is insufficient space between the fibers to place the optical flat and glue layer. Hence, the use of the imaging lens provides a second advantage to a switch according to the present invention.

Pedestal 102 may be fabricated using conventional photolithography techniques. Such techniques provide the required alignment precision and are easily mass produced. Techniques for providing V-groves in Silicon or Ceramics are well known to the micro-machining arts. For example, in the case of a silicon substrate, a KOH etchant may be used. KOH provides a non-isotropic etch in which the etch rate of the (111) plane is so low that the etch process is practically stopped at the (111) planes. Hence, an etch mask oriented toward the (110) direction on a (100) silicon wafer will result in a V-groove formed by two (111) planes intercepting each other at a precise angle of 70.53°. The depth of the V-groove is solely determined by the width of the mask opening. Hence, two-dimensional lithography may be used to create a precise three-dimensional V-groove structure.

After the fibers are positioned in pedestal 102, a single saw cut shown at 160 is introduced into pedestal 160 to separate it into two sections that can be moved relative to one another under the control of a motor or other actuator.

The above described embodiments of the present invention utilized an actuator to move the input fiber relative to the output fiber, thereby accomplishing the switching action. In switches with a large number of output fibers, the precision required to position the fibers becomes a problem. Problems of backlash in gears and fractional positioning accuracies limit the ability of inexpensive motors to position the fibers without some form of encoding system to provide feedback as to the actual location of the input fiber relative to the output fibers. In this regard, it should be noted that the fibers must be positioned to an accuracy of typically 2μm, since the cores of the corresponding fibers must be aligned. This is a small fraction of the fiber diameter. Hence, any encoding system must provide this level of accuracy without substantially increasing the cost of the switch.

A switch according to the present invention makes use of the inherent alignment accuracy in the pedestals described above to provide an encoder that may be used to determine the position of the input fiber relative to the output fibers. Refer now to FIG. 7 which is a top view of a fiber switch 200 which utilizes an encoder according to the present invention. Switch 200 may be viewed as a switch in which the output fibers 203–207 are divided into two groups. The first group 203–206 is used to output the signal and is analogous to the output fibers discussed above. The second group 207–210 are used to detect the location of platform 212 relative to platform 211 and to provide feedback to actuator 230 which provides the relative motion between platforms 211 and 212. The encoder fibers are illuminated by an LED light source through an encoding input fiber 202 which is rigidly positioned with respect to signal input fiber 201. This assures that the encoding fibers will be illuminated even when a signal is not present in the signal input fiber. The encoding fibers are preferably constructed from the same optical fibers used to form the signal fibers. Hence, the encoder will provide a signal only when the alignment is correct to within a tolerance of the order of the core of the optical fiber. Therefore, the encoder will have the required accuracy provided the optical fibers can be aligned with sufficient accuracy. As noted above, the platform construction technique described above provides that accuracy. Thus, an encoder according to the present invention can provide the required positioning accuracy at the expense of including some additional optical fibers.

Since the encoder utilizes single mode optical fibers it can provide the same level of alignment accuracy as that required to align single mode optical fibers. Thus, alignment tolerances of a few microns can be achieved.

The above described encoding system utilized one encoding fiber for each signal output fiber; however, it will be apparent to those skilled in the art that fewer encoding fibers may be utilized and still provide the required encoding function. In principle, encoding fibers only need be located at enough positions in the output fiber array to provide actuator 230 with sufficient fiduciary points to compute its current location. Each time an encoding fiber is passed, actuator 230 can update its position and proceed on "dead reckoning" from that point until it reaches the next encoding fiber. Hence, the actual number of encoding fibers needs only be a small fraction of the total number of output fibers.

It should also be noted that the encoding scheme taught in FIG. 7 will function with any switch scheme. That is, the encoding scheme according to the present invention may also be utilized with butt-coupled and collimated switch geometries.

While the above embodiments of the present invention utilized a one dimensional array of output fibers, it will be apparent to those skilled in the art that a switch according to the present invention may be constructed utilizing a two dimensional array or bundle of output fibers. In this case, actuator 230 shown in FIG. 7 must be capable of moving the input fiber in two dimensions as opposed to the simple one dimensional motion indicated in the figure.

Figure 8:
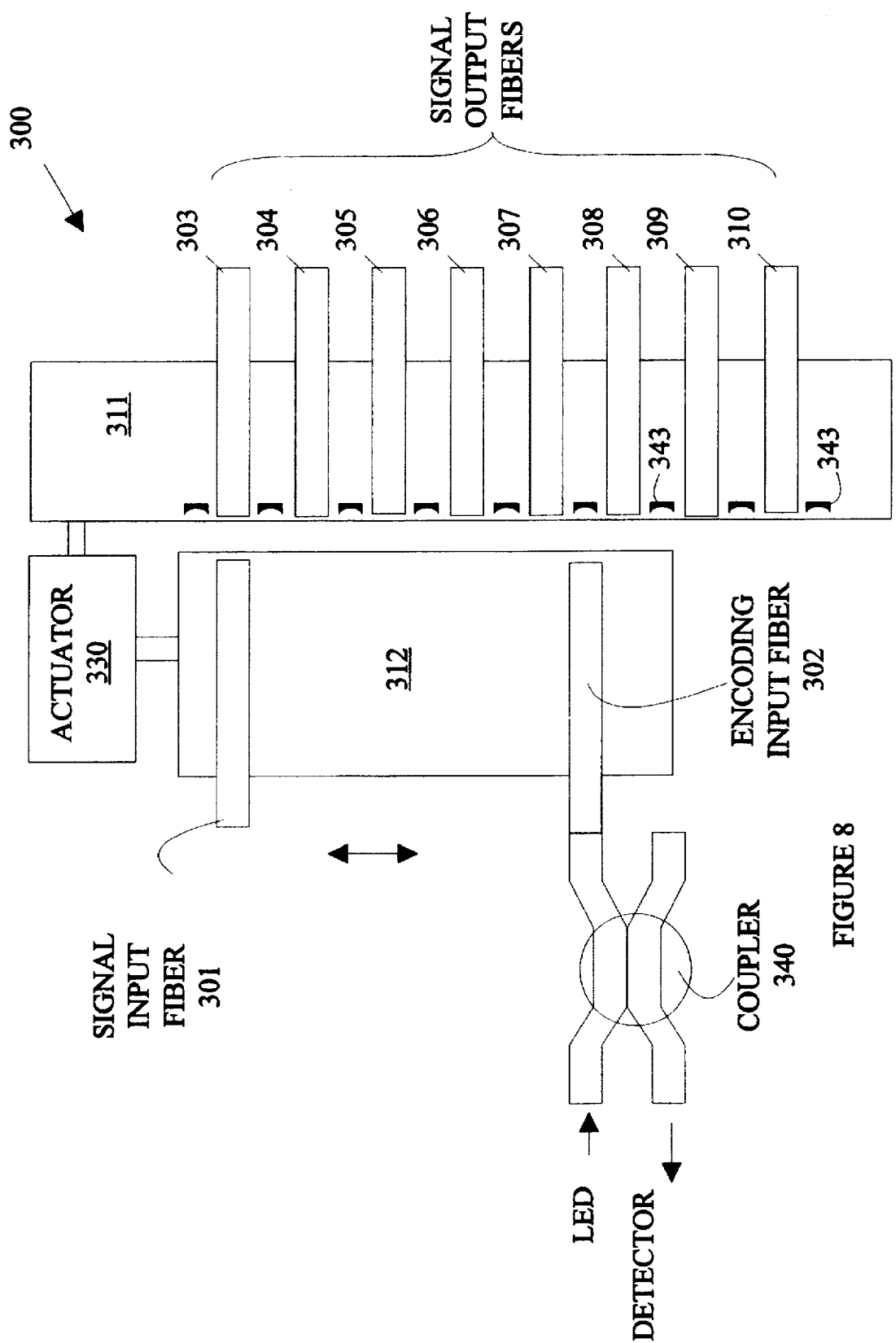
FIG. 8 is a top view of a switch utilizing a second embodiment of an encoding system according to the present invention.

When the number of "encoding fibers" is large, the geometrical arrangement of the fibers becomes more complicated. An embodiment of an encoder according to the present invention that avoids this problem is shown in FIG. 8 at 300. Encoder 300 is shown in conjunction with a switch for coupling light from an input fiber 301 to a selected one of a plurality of output fibers 303–310 under the control of an actuator 330. The output fibers are carried on carriage 311 and the input fiber is coupled to carriage 312.

The encoder is implemented utilizing an encoding fiber 302 and plurality of reflectors 343. The surface of each reflector is positioned and shaped such that light leaving encoding fiber 302 and striking the reflector will be re-imaged onto the core of encoding fiber 302 when encoding fiber 302 is properly aligned with the reflector. It should be noted that the orientation of the reflectors with respect to encoding fiber 302 must take into account the angle at which the end of encoding fiber 302 has been cut if the above described anti-reflection scheme is utilized on encoding fiber 302. Light is input to encoding fiber 302 by an LED or similar light source. The light re-imaged into encoding fiber 302 is routed to a detector with the aid of coupler 340.

While the above described embodiments of the present invention have been discussed in terms of single mode optical fibers, it will be apparent to those skilled in the art that the present invention is also applicable to multi-mode optical fibers, since the tolerances required for the alignment of such fibers are significantly less than those required for single mode optical fibers.

Various modifications to the present invention will become apparent to those skilled in the art from the foregoing description and accompanying drawings. Accordingly, the present invention is to be limited solely by the scope of the following claims.

What is claimed is:

1. A switch for selectively coupling light from an input optical fiber to a selected one of a plurality of output optical fibers, each of said output optical fibers having an end portion terminating in an end, said switch comprising:

a first carriage having said end portion of said input optical fiber attached thereto;

a second carriage having said end portion of each of said output optical fibers attached thereto such that each of said output optical fibers is characterized by an inter-fiber distance measured from said end of said input optical fiber to said attached end of that output optical fiber when that output optical fiber is aligned with said input optical fiber, said inter-fiber distance being between first and second distances, and said inter-fiber distance being different for at least two of said output optical fibers, said first distance being equal to the minimum of said distances and said second distance being equal to the maximum of said distances;

a lens for imaging light leaving said input optical fiber onto a plane located at a fiber-pane distance from said end of said input optical fiber, said fiber-plane distance being between said first and second distances, said lens being fixed in position relative to said end of said input optical fiber.

2. The switch of claim 1 further comprising:

an encoding input optical fiber having an end portion attached to said first carriage, said encoding input optical fiber being different from said input optical fiber; and an encoding output optical fiber having an end portion attached to said second carriage, said encoding input optical fiber and encoding output optical fiber being positioned such that light leaving said encoding input optical fiber will be received by said encoding output optical fiber when said first and second carriages are in a specific spatial relationship, said encoding output optical fiber being of the same mode type as said input optical fiber.

3. The switch of claim 2 wherein said input and output optical fibers are single mode optical fibers.

4. The switch of claim 1 further comprising:

an encoding input optical fiber having an end portion attached to said first carriage, said encoding input optical fiber being different from said input optical fiber; and a reflector attached to said second carriage, said reflector being shaped and positioned such that light leaving said end portion of said encoding input optical fiber is imaged back into said end of said encoding input optical fiber when said first and second carriages are in a specific spatial relationship.

5. The switch of claim 4 wherein said input optical fiber is a single mode optical fiber.

* * * * *